United States Patent [19]
Kennell et al.

[11] Patent Number: 6,016,600
[45] Date of Patent: Jan. 25, 2000

[54] METHOD OF ASSEMBLING A TURBINE RUNNER SITUATED IN A WATER PASSAGEWAY

[75] Inventors: Mark E. Kennell, Dallastown; Robert G. Grubb, York; Randy V. Seifarth, York; Robert D. Steele, York, all of Pa.

[73] Assignee: Voith Hydro, Inc., York, Pa.

[21] Appl. No.: 09/003,895

[22] Filed: Jan. 7, 1998

[51] Int. Cl.$^7$ ................................................. B23P 15/00
[52] U.S. Cl. .......................................... 29/889.1; 29/889.2
[58] Field of Search ................................ 29/889.1, 889.2, 29/889, 402.08, 402.11, 402.09, 402.03

[56] References Cited

U.S. PATENT DOCUMENTS

| | | | |
|---|---|---|---|
| 3,229,771 | 1/1966 | Hedberg . | |
| 4,202,084 | 5/1980 | Piguet | 29/889.2 |
| 4,590,653 | 5/1986 | Andes et al. | 29/889.1 |
| 4,822,243 | 4/1989 | Poucher . | |
| 4,863,347 | 9/1989 | Trott et al. . | |
| 5,209,632 | 5/1993 | Ito . | |
| 5,791,874 | 8/1998 | Lang | 29/889.1 |
| 5,799,394 | 9/1998 | Rice | 29/889.1 |

OTHER PUBLICATIONS

Drawing No. 4296–KK–1, dated Oct. 9, 1981, for Runner Hub Assembly–Sect.
Drawing No. 4296–KM–1, dated Feb. 3, 1982, for Runner Hub Assembly–Plan.
Drawing No. 4065–BPO–2, dated Oct. 27, 1982, for Runner Support Arrangement.
Drawing No. 4065–BPJ–1, dated Oct. 5, 1982, for Procedure To Open Blade Removal Hatch.
Drawing No. 4065–BKP–1, dated Oct. 11, 1982, for Procedure To Close Blade Removal Hatch.
Drawing No. 4460–PM–1, dated Jun. 5, 1982, for Aswan II Distributor Section Turbine.
Drawing No. 4460–PN–1, dated Aug. 6, 1982, for Aswan II Distributor Plan Turbine.
Drawing No. 4065–BQG–4, Sheet 1 of 2, dated Nov. 23, 1982, for Procedure to Close Blade Removal Hatch.
Drawing No. 4065–BQG–4, Sheet 2 of 2, dated Nov. 23, 1982, for Procedure to Close Blade Removal Hatch.
Drawing No. 4065–BQF–4, Sheet 1 of 2, dated Nov. 23, 1982, for Procedure to Open Blade Removal Hatch.
Drawing No. 4065–BQF–4, Sheet 2 of 2, dated Nov. 23, 1982, for Procedure to Open Blade Removal Hatch.
Drawing No. 4065–BQM–4, Sheet 1 of 2, dated Dec. 9, 1982, for Runner Support Erection Procedure.
Drawing No. 4065–BQM–4, Sheet 2 of 2, dated Dec. 9, 1982, for Runner Support Erection Procedure.

*Primary Examiner*—I. Cuda
*Attorney, Agent, or Firm*—Foley & Lardner

[57] ABSTRACT

A method of assembling a turbine runner while it remains situated in a water passageway. The turbine runner comprises a hub having a longitudinal axis, spaced apart outer and inner surfaces defining a cavity, and a corresponding plurality of blades pivotally connected to the hub. Each blade has a trunnion and is supported in rotation by an associated blade support assembly including at least one trunnion bushing. The cavity substantially encloses the support assemblies. The method comprises the steps of assembling a maintenance platform in the water passageway below the runner, installing for at least one of the blades a new trunnion bushing in the associated blade support assembly, and removing the maintenance platform from the water passageway. The hub has an inner hub for supporting the trunnion bushing, and the inner hub may be split into upper and lower inner hubs which may be uncoupled for installing the new trunnion bushing. The runner is surrounded by a discharge ring for directing a flow of water past the runner blades. The discharge ring may include a pocket configured to receive a distal end of one blade. The blade may be slid outwardly into the pocket to obtain additional working room for installing the new trunnion bushing.

20 Claims, 10 Drawing Sheets

METHOD OF ASSEMBLING A TURBINE RUNNER SITUATED IN A WATER PASSAGEWAY

FIELD OF THE INVENTION

The present invention relates generally to hydroelectric turbine installations. More particularly, this invention pertains to hydroelectric installations utilizing propeller-type turbines in which the angular position of the runner blades relative to the hub of the turbine or propeller, i.e. the pitch of the blades, is adjustable.

BACKGROUND OF THE INVENTION

Hydroelectric turbine installations in which the turbine comprises several adjustable pitch runner blades are widely used. In these turbines, each runner blade (often simply called a "blade"), is pivotally connected to the hub and rotatable about an axis extending in a direction generally perpendicular to the hub. The rotation of each blade about its axis permits the turbine operator to seek optimum efficiency of the hydroelectric installation under the entire range of operating conditions of the turbine. In the hydroelectric industry, turbines with adjustable pitch blades are commonly referred to as "Kaplan turbines". Kaplan turbines are also typically provided with adjustable wicket gates designed to regulate the flow of water admitted to the turbine. Although providing hydroelectric installations with adjustable pitch blades can materially improve the efficiency of the installations, some potential concerns result from the functional design requirements of Kaplan turbines.

One such potential concern with Kaplan turbines involves the maintenance of certain components necessary for permitting rotation of the blades such as bearings, pins, shafts, seals, bushings and other devices. Some of these components are particularly subject to severe operating conditions and may require replacement. One such component is the trunnion bushings (or bearings) used to support the blades for rotation about the horizontal axes. Replacing worn-out trunnion bushings is particularly time consuming because the runner must be removed from its operating position, disassembled and then reassembled. The disassembly includes all the rotating components and most stationary components above the runner assembly, which for a typical Kaplan turbine runner may require from 700 to 750 man hours. Further, replacing these trunnion bushings is costly due to equipment and manpower needed to remove the turbine runner from the water passageway.

Another potential concern is the inadvertent release of lubricating fluid from the hub of Kaplan turbines. More specifically, a lubricating oil (or so called hub oil) is typically provided in the runner hub for lubrication of runner blade trunnion, trunnion bushings, and other rotating or sliding parts of hub operating mechanisms. With these systems, the hub enclosure is pressurized to prevent water from leaking in through the seal part of the runner blade trunnion. While this approach effectively prevents water from entering the hub, it also increases maintenance problems and creates the risk of oil leaking and flowing out of the hub and into the water passage. If the seal packing of the runner blade trunnion or trunnion itself is damaged, defective, or worn-out, contamination of the water may result.

Accordingly, it appears desirable to develop turbine installations in which certain components of the hub allowing rotation of the blade are modified to permit replacement of worn-out components without removing the runner from its operating position (i.e., without performing a total disassembly of the hub), to reduce maintenance time and expense. In addition, it appears desirable to develop turbine installations in which the lubricating oil typically filling the hub can be replaced with an environmentally compatible fluid or non-toxic media, such as water, biodegradable oils and/or a gas such as air, so that leakage of hub fluid is not a concern.

SUMMARY OF THE INVENTION

The present invention eliminates a potential source of water pollution and facilitates the maintenance of a turbine of the adjustable blade type, thereby reducing the cost of maintenance operations.

According to a preferred method of the invention, a turbine runner may be assembled while it remains situated in a water passageway leading from an upper elevation source to a lower elevation discharge region. The turbine runner is of the type comprising a hollow hub filled with an environmentally compatible fluid and a plurality of blades pivotally connected to the hub. The hub has spaced apart outer and inner surfaces defining a cavity. Each blade has a trunnion and is supported in rotation by an associated blade support assembly including at least one trunnion bushing. The cavity substantially encloses the support assemblies. The method comprises the steps of assembling a maintenance platform in the water passageway below the runner, installing for at least one of the blades a new trunnion bushing in the associated blade support assembly, filling the cavity with fresh environmentally compatible fluid, and removing the maintenance platform from the water passageway.

According to another method of the invention, each blade is detachable from an associated trunnion which is supported in rotation by the associated blade support assembly and guided in rotation by the at least one trunnion bushing. The associated trunnion and the at least one trunnion bushing are configured to be removable and installable in the cavity without disturbing the at least one of the blades. The method comprises the steps of assembling a maintenance platform in the water passageway below the runner, and installing for at least one of the blades a new trunnion bushing in the associated blade support assembly. The method further comprises the steps of positioning the associated trunnion for guided rotation by the at least one new bushing, attaching the at least one of the blades to the associated trunnion, and removing the maintenance platform from the water passageway.

According to yet another method of the invention, the turbine runner is surrounded by a discharge ring for directing a flow of water past the runner blades. The discharge ring includes at least one pocket configured to receive a distal end of at least one of the blades. The method comprises the steps of assembling a maintenance platform in the water passageway below the runner, sliding at least one of the blades radially outwardly until a distal end thereof is within the pocket, and positioning at least one new trunnion bushing within the cavity in axial alignment with an associated trunnion of the at least one of the blades. The method further comprises the steps of sliding the at least one of the blades radially inwardly until the distal end is free of the pocket and the associated trunnion extends within the new trunnion bushing for guided rotation therein, and removing the maintenance platform from the water passageway.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

The present invention relates generally to hydroelectric installations having turbines provided with features designed to reduce pollution of the water flowing through the turbine and to reduce maintenance time and expense. More specifically, the turbines have features configured to eliminate pollution caused by oil leaking form the hub and to allow replacement of worn-out components while the runner remains in its operating position. The turbines are of the Kaplan-type in which several blades are pivotally connected to the hub. It should be understood, however, that the invention is applicable to any other type of turbine or propeller in which the blades are pivotally adjustable with respect to the hub. In addition, the features relating to maintenance issues in the oil-free turbine embodiments described herein are of course applicable to turbines filled with oil.

Figure 1:
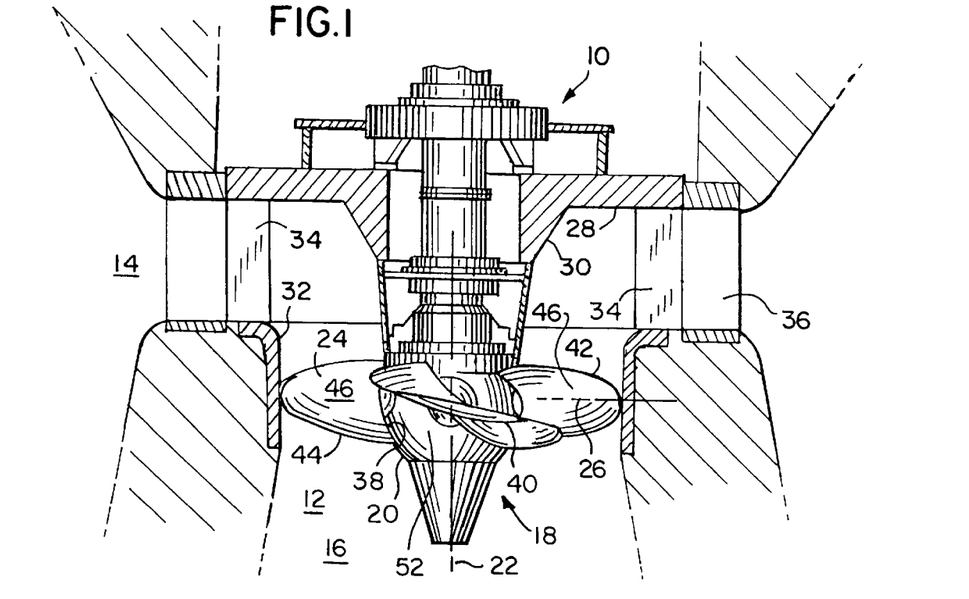
FIG. 1 is a front elevational view, partially in cross-section, of a hydroelectric installation including a turbine with adjustable blades.

Referring to FIG. 1, a hydroelectric turbine installation generally designated as 10 comprises a passageway 12, in which water flows from an upper elevation source in fluid communication with an upstream end 14 of installation 10, to a lower elevation discharge region 16. Installation 10 also includes a turbine 18 of the type comprising a hub 20 having a longitudinal axis 22, and a plurality of runner blades 24 pivotally connected to hub 20. Each blade 24 is movable about a rotational axis 26 extending in a direction generally perpendicular to longitudinal axis 22. While the present invention will be described with reference to turbine 18 in which longitudinal axis 22 is vertical as shown in FIG. 1, those skilled in the art will appreciate that the present invention is similarly applicable to turbines disposed horizontally or at any position deviating from the horizontal or vertical, depending on the particular configuration of passageway 12. Additionally, axes of rotation 26 could be inclined relative to longitudinal axis 22 (as in "Deriaz" turbines) without in any way departing from the scope of the present invention.

Disposed intermediate upstream end 14 and rotational axis 26 are an outer headcover 28, an intermediate headcover 30, and a discharge ring 32 which together direct the flow of water from upstream end 14 toward turbine 18. Installation 10 includes several wicket gates 34, which are adjustable in rotation to regulate the flow of water admitted to passageway 12. Installation 10 also includes stay vanes 36 which are designed to support the portion of installation 10 located above turbine 18, e.g., the thrust bearing, generator, and associated control systems and components typically located in the power station.

Turbine 18 typically includes between three and eight runner blades 24. However, in various Figures and the description to follow, only one blade will be represented to facilitate the description of the present invention. Still referring to FIG. 1, blade 24 comprises a hydrofoil having an inner edge 38 and a distal outer edge 40, and a leading edge 42 and a trailing edge 44 separated from each other by a water directing surface 46 which comprises oppositely facing pressure and suction sides.

Figure 3:
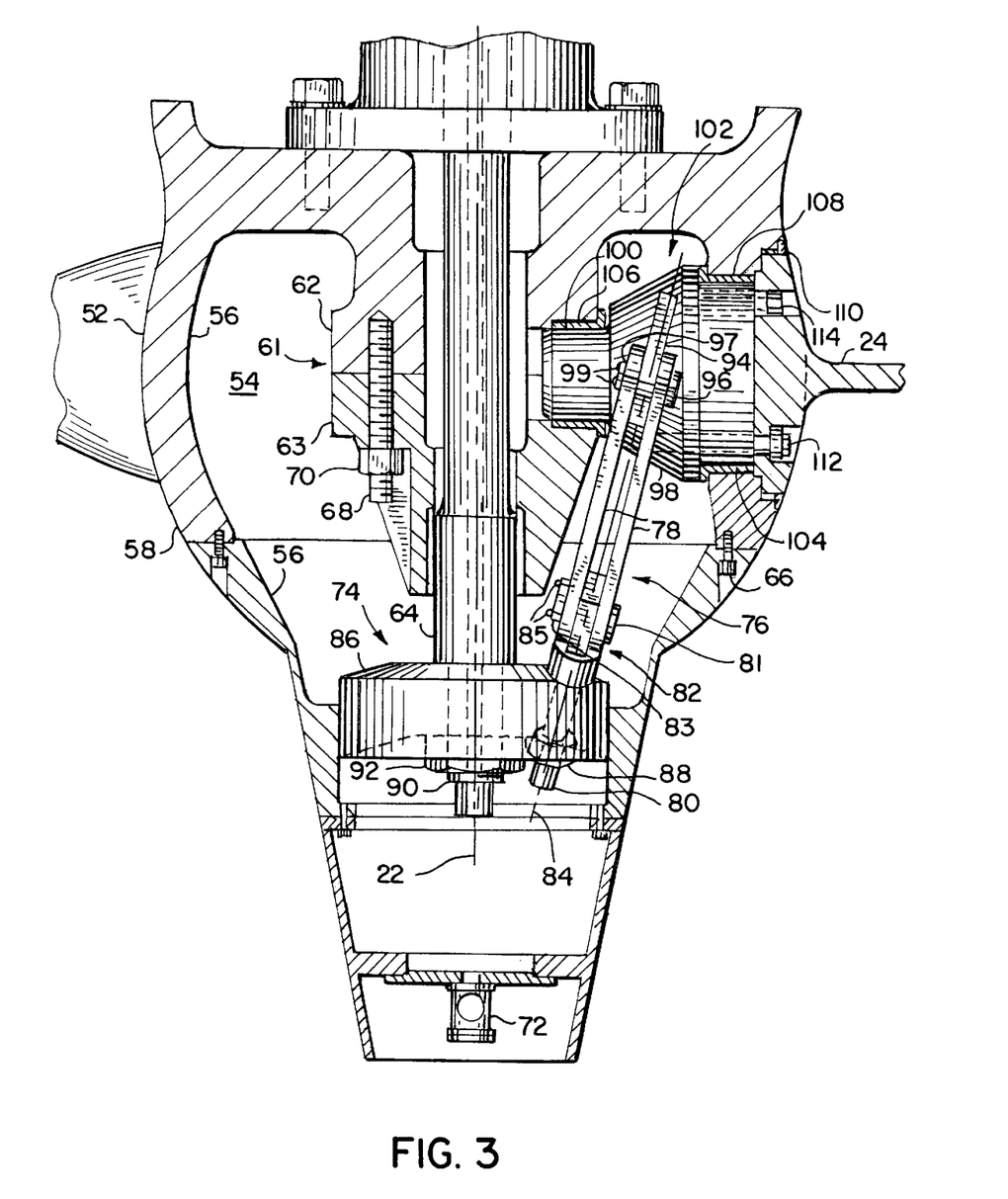
FIG. 3 is a partial sectional view of the hub taken in a plane along one of the blades rotational axis showing the linkage connecting the blade to the operating rod.

Referring now to FIG. 3, hub 20 has an outer surface 52 and is generally hollow with a cavity 54 defined by an inner surface 56. As will be explained below, cavity 54 conveniently houses the various mechanisms, linkages and other systems necessary for the rotation of blades 24 about axes 26. Hub 20 comprises an upper portion 58 from which blades 24 extend, a runner deflector 60 which forms a lower portion of hub 20, and an inner hub 61 which extends downwardly within cavity 54 around an operating rod 64. Inner hub 61 is split into an upper inner hub 62, which preferably is integral with upper hub portion 58, and a lower inner hub 63. Deflector 60 is secured to upper portion 58 by bolts 66 (or studs and nuts), and lower inner hub 63 is secured to upper inner hub 62 by studs 68 and nuts 70. Cavity 54 of hub 20 is filled with an environmentally compatible fluid such as water, biodegradable oil(s) and/or a gas such as air. A drain valve 72 is provided to fill cavity 54 with fluid and/or to drain fluid from cavity 54.

Operating rod 64 is part of a drive mechanism (generally designated as 74) which may also include one or several servo-motors, hydraulic cylinder(s), or hydraulic motor(s) for causing rotation of blades 24 about axes 26. Drive mechanism 74 is connected to blades 24 via a linkage mechanism (generally designated as 76) for rotating blades 24 about rotational axes 26 in response to appropriate command signals received by mechanism 74. Linkage mechanism 76 preferably includes a pair of links 78 and a link bolt 80 joined together by a maintenance free spherical joint (generally designated as 82). Joint 82 preferably includes a link pin 81 secured to a link pin cover 83 by a plurality of threaded fasteners 85. The components of linkage mechanism 76 generally extend along a longitudinal axis 84 which forms an angle with hub axis 22. Link bolt 80 is removably connected to a crosshead 86 by a nut 88, and crosshead 86 is assembled onto a lower end 90 of operating rod 64 and secured thereto by a large nut 92. The upper ends of links 78 are secured to a planar arm 94 (e.g., by a link pin 96, link cover 97 and fasteners 99) of a blade lever rocker arm 98, with planar arm 94 extending lengthwise along the general direction of longitudinal axis 84.

Blade lever rocker arm 98 is preferably integrally formed with a runner blade inner trunnion 100, which together form part of a blade support assembly generally designated as 102. Blade support assembly 102 includes the primary components of integral blade lever rocker arm 98 and inner trunnion 100, a runner blade outer trunnion 104, a split inner trunnion bushing (or bearing) 106, an outer trunnion bushing (or bearing) 108, and a trunnion seal 110. Blade 24 is removably secured to blade support assembly 102 by bolts (or studs and nuts) 112, with a required number of tapered dowel/sleeves 114 provided for carrying the shear load prior to installation of bolts 112 (i.e., for preloading the coupling).

Figures 7, 7A:
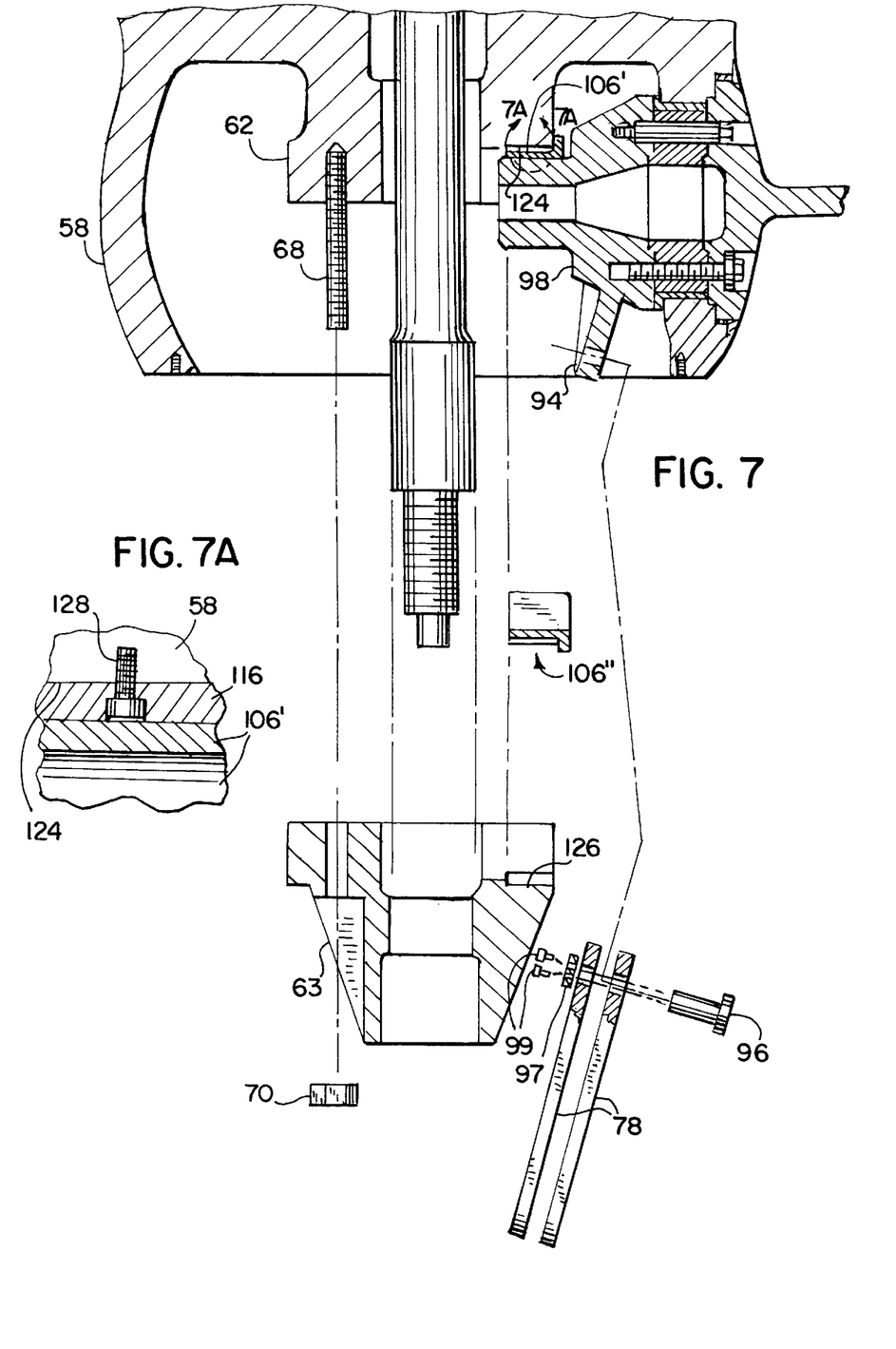
FIG. 7 is a partial sectional view of the upper portion of the hub of FIG. 5, illustrating the lower inner hub, links, and split inner trunnion bushing being removed from the hub.
FIG. 7A is an enlarged cross-sectional view of the inner trunnion bushing area of FIG. 7 showing the portion thereof bounded by line 7A—7A shown in FIG. 7.
Figure 8:
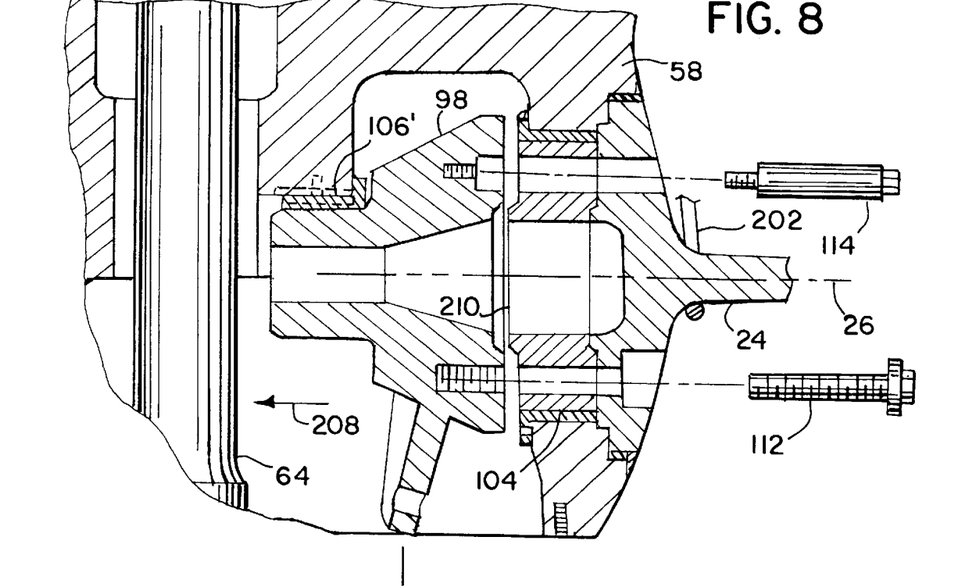
FIG. 8 is an enlarged sectional view of the blade support assembly of the hub of FIG. 7, illustrating the integral inner trunnion and blade lever rocker arm being shifted radially inwardly to disengage it from the spigot on the outer trunnion.
Figure 9:
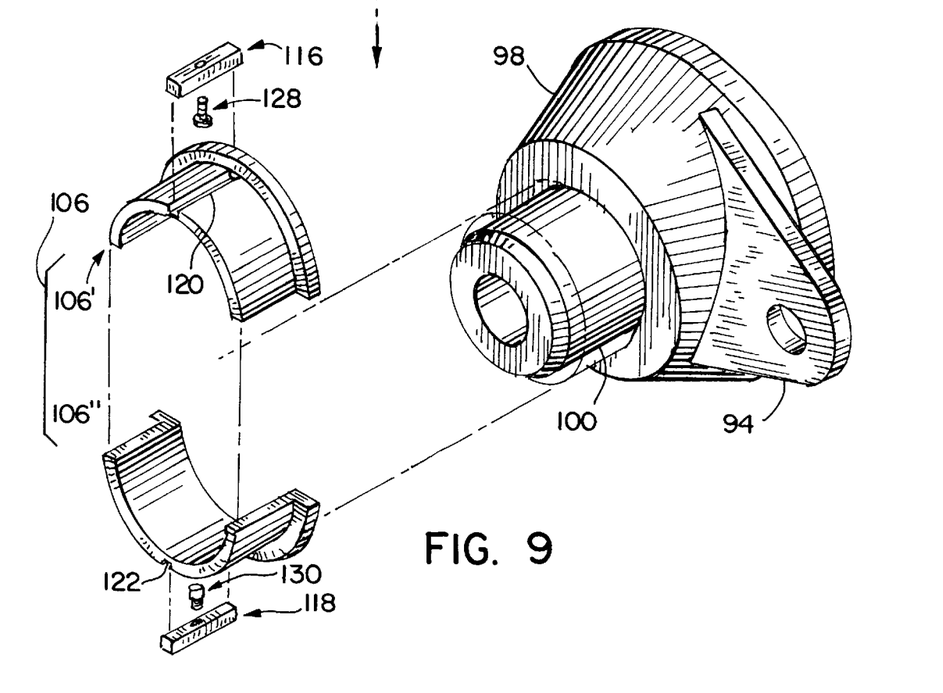
FIG. 9 is an exploded perspective view of the integral inner trunnion and blade lever rocker arm along with the surrounding upper and lower split trunnion bushing halves.

Referring now to FIGS. 7–9, split inner trunnion bushing 106 (see FIG. 9) preferably comprises a trunnion bushing upper half 106' and a trunnion bushing lower half 106". Trunnion bushing upper and lower halves 106' and 106" are prevented from rotation when mounted by inner trunnion bushing keys 116 and 118, respectively. Of course, one or both of bushing halves 106' and 106" could include an integrally formed key, in which case keys 116 and 118 would not be needed to prevent rotation of trunnion bushing 106. Keys 116 and 118 are configured to fit within axial key slots 120 and 122, respectively, which are provided in trunnion bushing upper and lower halves 106' and 106", positioned at 90° from the split. Keys 116 and 118 are similarly configured to fit within key slots 124 and 126 provided in upper inner hub 62 and lower inner hub 63, respectively (see FIG. 7). Preferably, tap bolts 128 and 130 extend into counter bores provided mid-distance along slots 124 and 126 to anchor keys 116 and 118 to upper inner hub 62 and lower inner hub 63, respectively (see FIG. 7A).

Inner trunnion bushing 106 and outer trunnion bushing 108 are preferably of the self-lubricated (or greaseless) variety so that an environmentally compatible hub fluid such as air or water can be substituted in place of the traditional oil. Self-lubricated bushing of various types may be used, including bushings made entirely of elastomer or plastic composites. Preferably, however, trunnion bushings 106, 108 are made of bronze with a lubricating layer provided on an inside guiding surface of each bushing. Teflon (polytetrafluoroethylene or PTFE) is a preferred material for the lubricating layer because of its availability and highly favorable properties. Other materials which may be suitable for the lubricating layer include graphite, which may be impregnated in the plastic composite type bearings or bronze substrate type bearings, or the graphite may be installed in trepanned holes in the bronze substrate type bearings.

Figure 12:
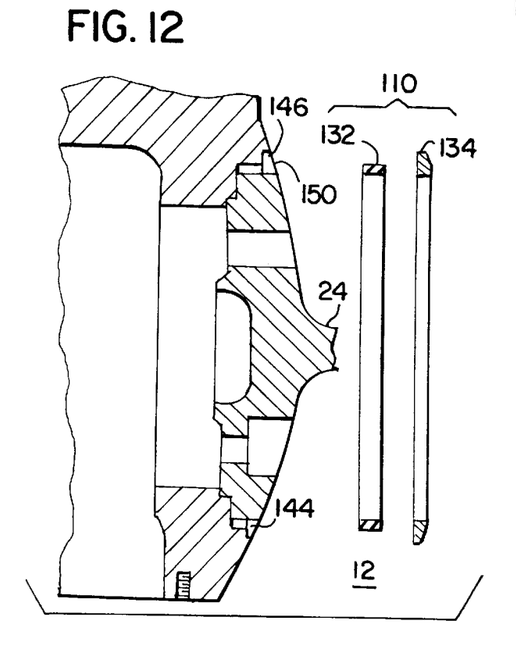
FIG. 12 is a sectional view of the blade support assembly of the hub of FIG. 11, illustrating the trunnion seal being removed.

Turning now to FIG. 12, trunnion seal 110 preferably comprises a seal packing 132 and a packing cover 134. Seal packing 132 is illustrated in FIG. 10A as a one-piece seal ring of the single-acting type and comprises a number of rubber components 136, 138, 140 and 142. Seal packing 132 is configured to fit within an annular inner groove 144 and is held in place by packing cover 134. Packing cover 134, which may conveniently comprise a number of segments, is secured in an annular outer groove 146 by bolts 148. Outer groove 146 is concentric with and overlaps inner groove 144 and has an identical inner diameter which surrounds a collar 150 of blade 24. It is worth noting that although a single-acting type seal may be used in the case where the fluid in hub cavity 54 is maintained at a higher pressure than the pressure of the working fluid surrounding hub 20 in water passageway 12, a traditional double-acting type seal could of course be used instead.

Now that turbine installation 10 has been fully described, a method of disassembling and (re)assembling hub 20 will be described. The method allows for easy replacement of worn-out or defective trunnion bushings (among many other components as described in the background discussion above) while the runner remains substantially assembled in its operating position, i.e., without removing the runner from water passageway 12 and performing a total disassembly of hub 20, which would have been the typical and costly procedure used in the past.

Figure 2:
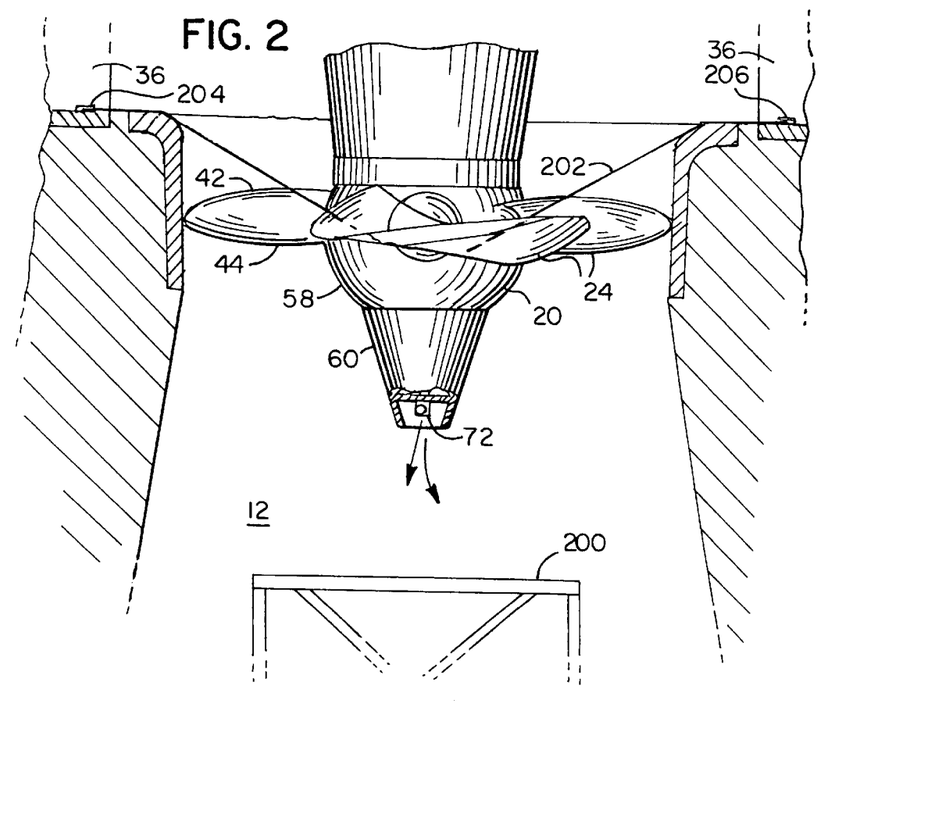
FIG. 2 is a partial front elevation view of the hub and blades with the discharge ring regions of the turbine shown in partial sectional view, illustrating one of the blades being supported by a sling above a work platform.

Turning first to FIG. 2, a temporary maintenance platform 200 is assembled in the draft tube below the runner, that is, in water passageway 12 below hub 20. Platform 200 must have the structural strength and dimensions to support the weight and size of runner deflector 60, lower inner hub 63, linkage mechanism 76, crosshead 86, integral blade lever rocker arm 98 and inner trunnion 100, and outer trunnion 104 along with the worker and miscellaneous equipment and components.

Drive mechanism 74 is stroked to rotate runner blades 24 to a tilt that will allow deflector 60 to be detached from upper hub portion 58 (namely, a minimum blade tilt closed position), and hub fluid from cavity 54 is drained via drain valve 72. Of course, the step of draining the fluid is omitted if the hub fluid is air. Each blade 24 can be supported for example by extending a sling 202 beneath the belly of blade 24 (as shown in FIG. 2). Sling 202 can be anchored to a number of suitable lifting points within water passageway 12 such as to outer headcover 28 or intermediate headcover 30 (see FIG. 1). As illustrated in FIG. 2, sling 202 is conveniently anchored to taps 204 and 206 installed in water passageway 12 adjacent stay vanes 36. Alternatively, instead of supporting blade 24 under its belly by sling 202, lugs could be welded to the pressure side of blade 24, and "come alongs" could then be used to support blade 24 and facilitate manual rotation of the blade in a later step as explained below.

Figure 4:
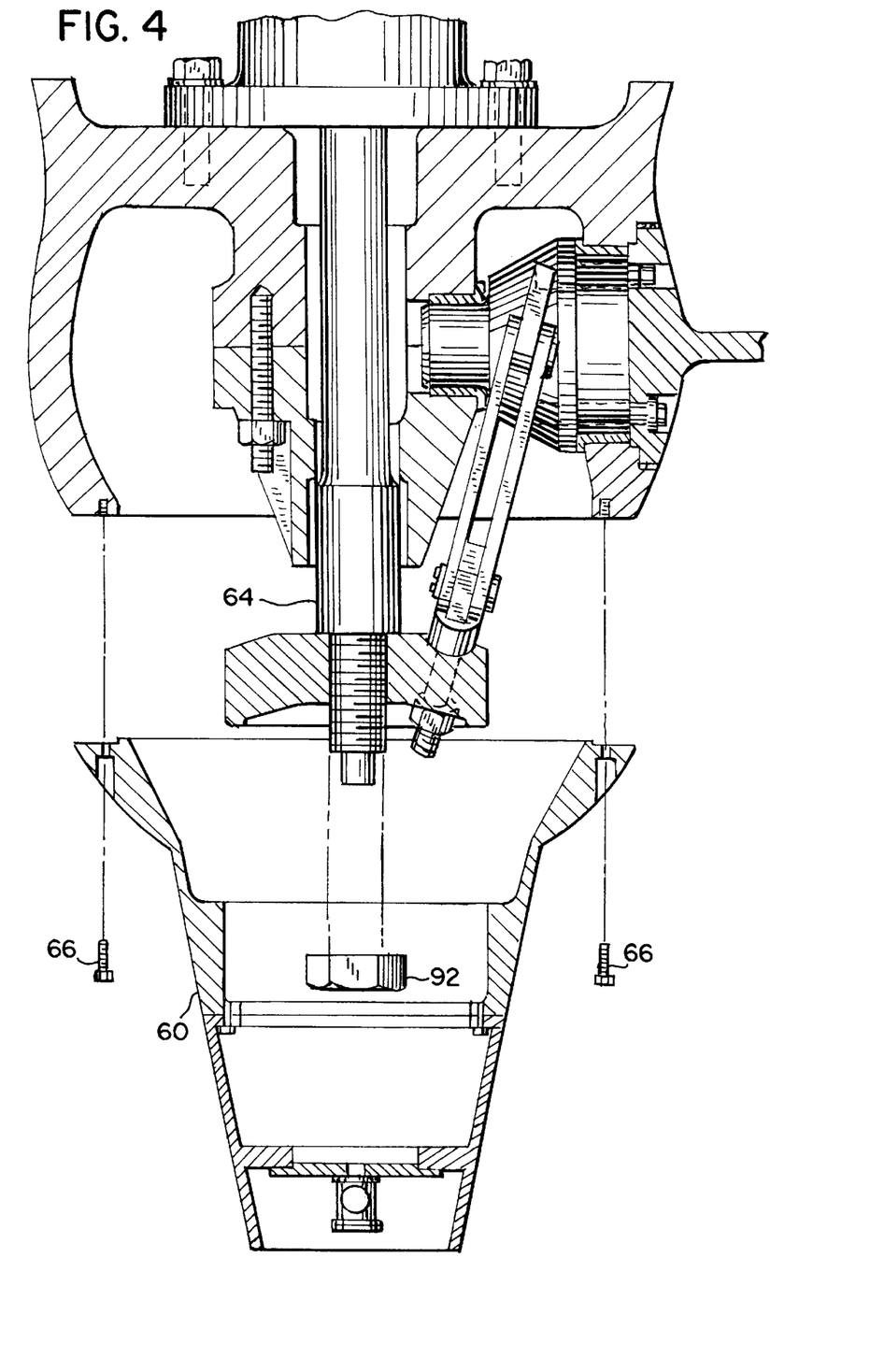
FIG. 4 is a partial sectional view of the hub similar to FIG. 3, illustrating the deflector being removed from the hub.

Turning next to FIG. 4, runner deflector bolts 66 are removed so that deflector 60 can be lowered to platform 200. Although not shown, some type of lowering device such as threaded rods may be needed to safely lower deflector 60 to platform 200 due to the weight of deflector 60. After removing deflector 60, the worker can easily remove operating rod nut 92 from operating rod 64.

Figures 5, 6:
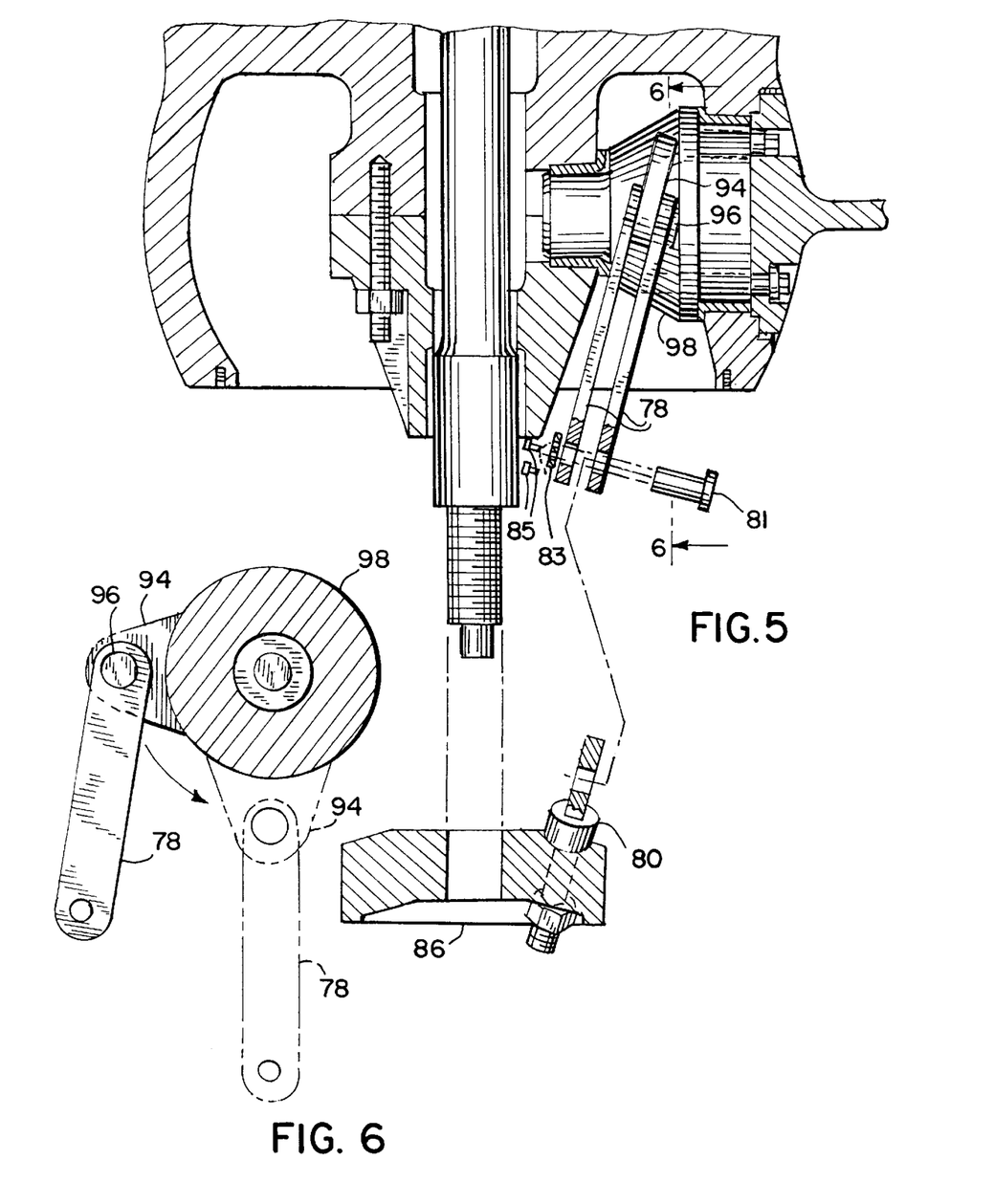
FIG. 5 is a partial sectional view of the upper portion of the hub of FIG. 4, illustrating the cross-head and link bolt being removed from the hub.
FIG. 6 is a partial sectional view of the blade lever rocker arm and links taken along line 6—6 in FIG. 5, with the blade lever rocker arm being rotated so that the links hang directly underneath.

Referring now to FIGS. 5 and 6, crosshead 86 is removed, again using lifting points and lifting devices as needed. To remove crosshead 86, the worker must first remove link pin 81 (e.g., by using oil/grease pressure via an injection hole provided), however, link bolt 80 may remain fastened to crosshead 86. Once crosshead 86 is removed, blade lever rocker arm 98 is then rotated (e.g., by manually rotating blade 24 by hand or using "come alongs") until links 78 hang directly underneath blade lever rocker arm 98 (see FIG. 6).

Turning next to FIGS. 7 and 7A, blade lever link pin 96 is then removed so that links 78 can be detached from blade lever rocker arm 98 and lowered to platform 200. Of course, this needs to be done for each blade 24 of hub 20. Lower inner hub 63 is then uncoupled from upper hub portion 58 by removing studs 68 and nuts 70, and lower inner hub 63 is then lowered to platform 200 by utilizing lifting points and lifting devices.

Referring now to FIG. 8, bolts 112 and tapered dowel/sleeves 114 (securing runner blade 24 to blade lever rocker arm 98) are removed, with blade 24 illustrated as supported by sling 202. At this point, integral blade lever rocker arm 98 and inner trunnion 100 may be shifted radially inwardly (as indicated by movement arrow 208) towards operating rod 64 along runner blade axis 26 until it disengages from a spigot 210 provided on a central portion of outer trunnion 104. Integral blade lever rocker arm 98 and inner trunnion 100 may then be lowered to platform 200 utilizing lifting points and lifting devices. Inner trunnion bushing lower half 106" may yet remain on inner trunnion 100 and, if so, can be removed when placed on platform 200. Alternatively, it may have already been removed with the removal of lower inner hub 63 as described above (see FIG. 7). Each integral blade lever rocker arm 98 and inner trunnion 100 is removed by repeating this step.

Figure 10:
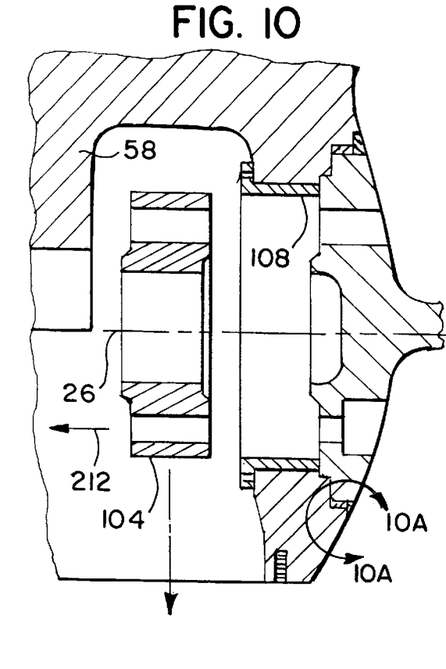
FIG. 10 is a sectional view of the blade support assembly of the hub of FIG. 8, illustrating the outer blade trunnion being shifted radially inwardly to disengage it from the outer trunnion bushing.
Figure 10A:
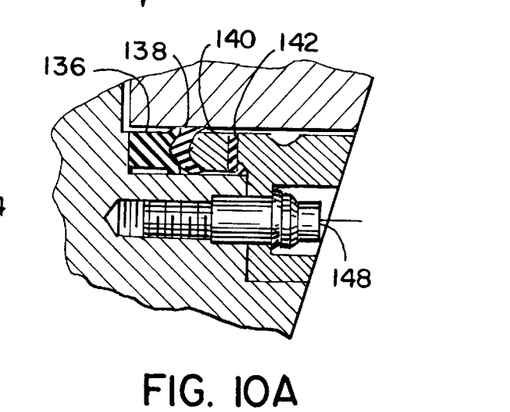
FIG. 10A is an enlarged cross-sectional view of the trunnion seal area of FIG. 10 showing the portion thereof bounded by line 10A—10A shown in FIG. 10.

As shown in FIG. 10, runner blade outer trunnion 104 is removed by sliding it radially inwardly (as indicated by movement arrow 212) towards operating rod 64 along blade axis 26 until it disengages from outer trunnion bushing 108. Outer trunnion 104 is then lowered to platform 200 utilizing lifting points and lifting devices. This is repeated once to remove each outer trunnion 104.

Figure 11:
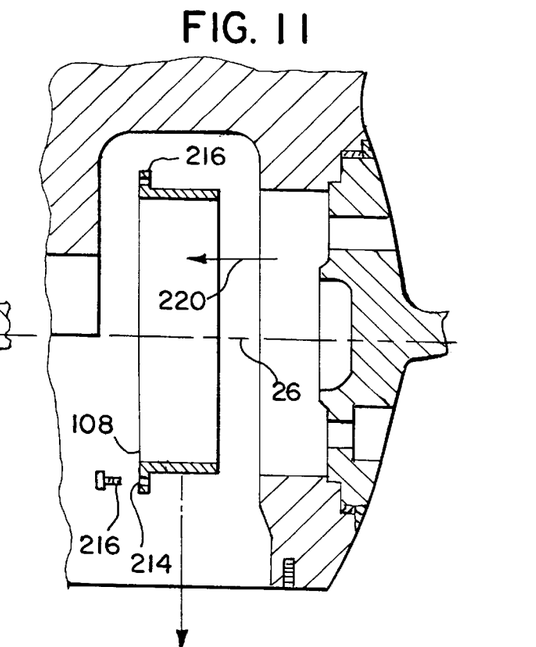
FIG. 11 is a sectional view of the blade support assembly of the hub of FIG. 10, illustrating the outer trunnion bushing being shifted radially inwardly to remove it from the hub.

Turning next to FIG. 11, outer trunnion bushing 108 is removed from upper hub portion 58 and lowered to platform 200 utilizing lifting points and lifting devices. To assist with the removal of outer trunnion bushing 108, a plurality of small holes 214 may be provided at spaced locations around a flange 216 so that it may be conveniently removed from hub portion 58 via jack bolts 218. Alternatively, outer trunnion bushing 108 could be shrunk by applying, for example, liquid nitrogen as is known in the art. However accomplished, trunnion bushing 108 is removed by sliding it radially inwardly (as indicated by movement arrow 220) towards operating rod 64 along blade axis 26 until it disengages from upper portion 58. This is repeated once for each outer trunnion bushing 108.

Referring now to FIG. 12, runner blade trunnion seal 110 is removed and replaced from the outside of hub 20. More specifically, seal 110 is removed by removing packing cover 134 from groove 146, which can be unbolted while blade 24 remains in water passageway 12, and this provides a direct view of seal packing 132. Seal packing 132 is then cut and pulled out of groove 144.

Although the above described method is for disassembling hub 20, the method of assembling (or reassembling) hub 20 is essentially accomplished by reversing the order of the steps just described. Of course, before assembling hub 20 all components (e.g., runner blade bearing journal areas) are completely cleaned and inspected for wear and damage, with components being repaired and replaced as necessary. In addition, when assembling hub 20 new inner and outer trunnion bushings are used, all seals are replaced, and all fasteners are cleaned, installed, torqued properly and locked. Moreover, when installing a new seal a split seal arrangement can be used with the seal bonded at the split to form a complete ring once in place, and compression is then applied by packing cover 134. Finally, the environmentally compatible fluid is pumped back into runner hub cavity 54 via drain valve 72 or other fill connections. Of course, this filling step is omitted if the hub fluid is air, or if the hub fluid is clean river water and the hub is configured to fill naturally when water passageway 12 is flooded.

Figure 13:
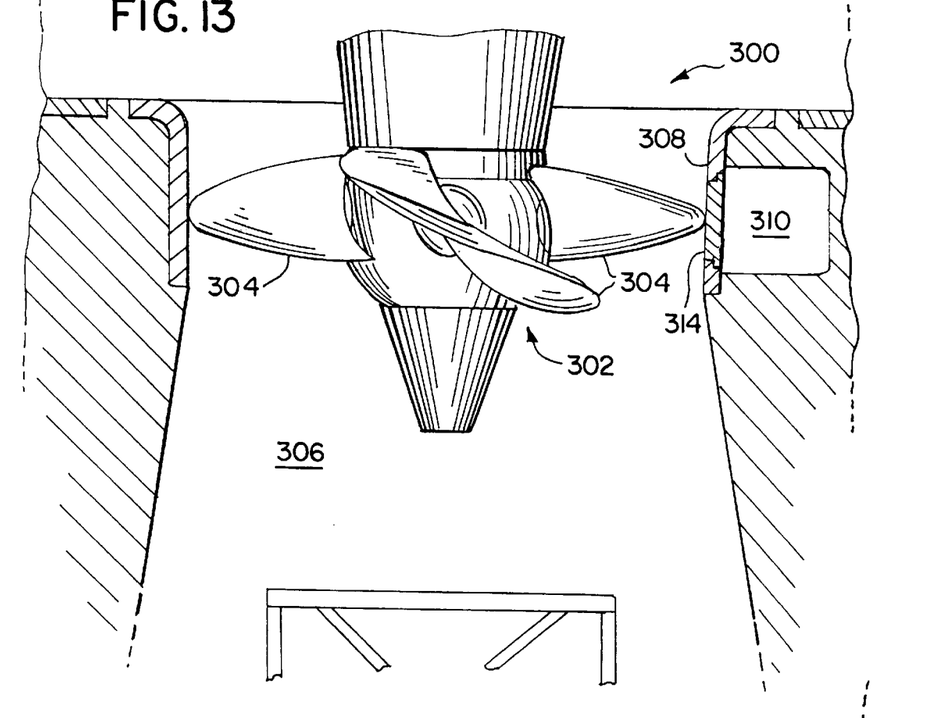
FIG. 13 is a partial front elevation view of an alternative turbine installation with the discharge ring having a pocket for receiving a distal end of one blade, showing the discharge ring regions of the turbine in partial sectional view.
Figure 14:
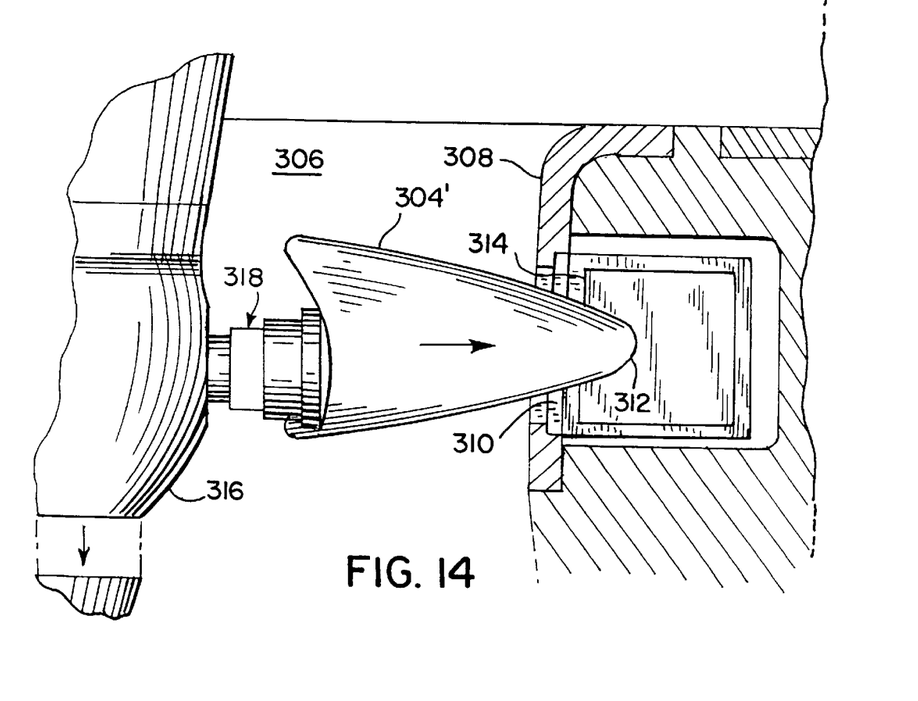
FIG. 14 is an enlarged front elevation view of a portion of the turbine runner and surrounding foundation of FIG. 13, with the distal end of one blade shown extended into the pocket.
Figure 15:
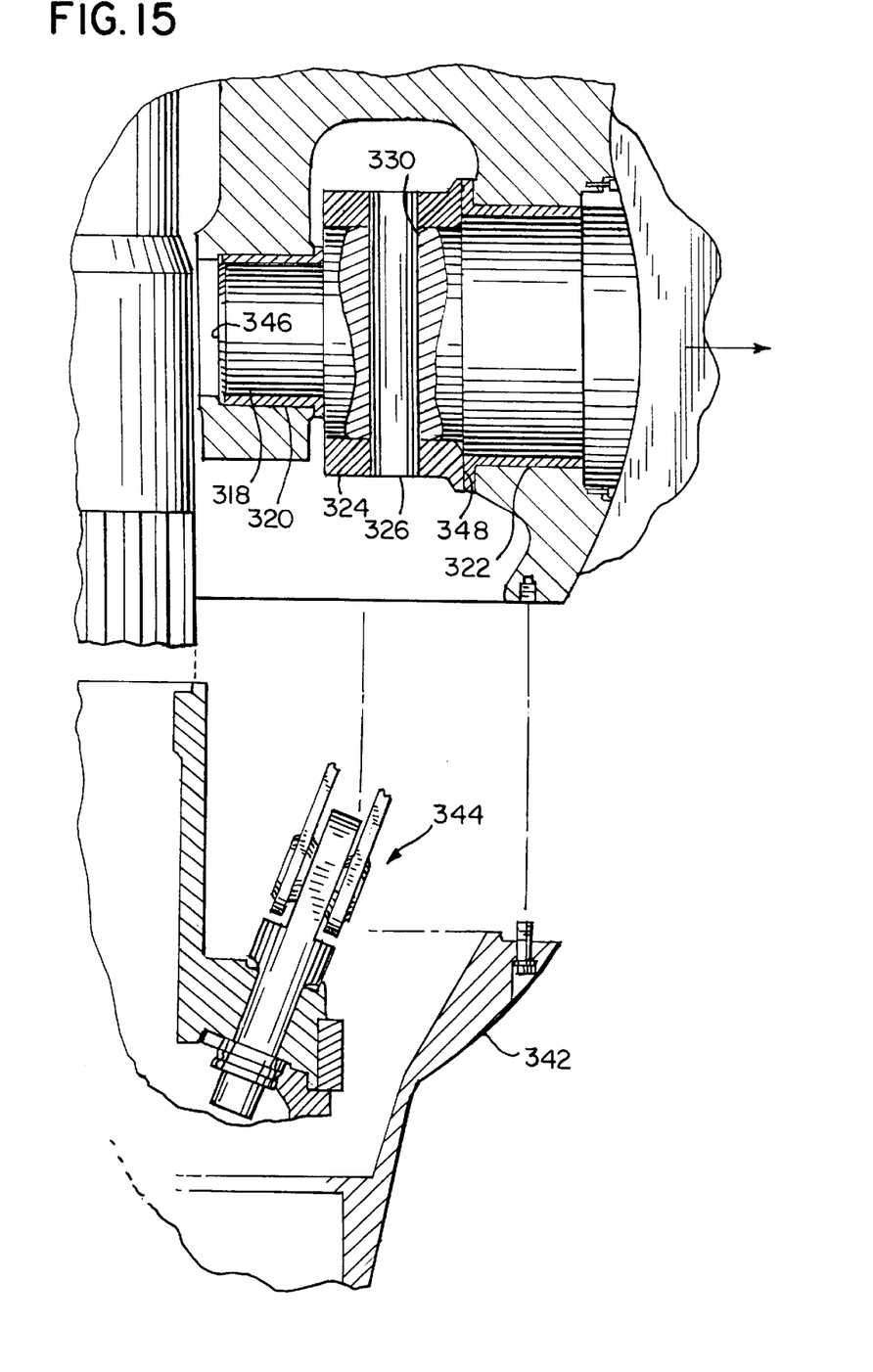
FIG. 15 is an enlarged partial sectional view of a blade support assembly within the hub of FIG. 13, illustrating the blade support assembly rotatably supporting a blade with an integral trunnion, some components shown schematically, and the deflector and blade linkage components being removed.

With reference to FIGS. 13–15, another embodiment of a turbine installation 300 of the type having a turbine runner 302 with variable pitch blades 304 will be described in combination with a method of disassembling (or assembling) runner 302. The description of turbine 300, however, will generally be limited to aspects thereof which differ from turbine 10 as described above (and illustrated in FIGS. 1–12), with the remaining aspects otherwise being substantially the same.

Referring first to FIGS. 13 and 14, turbine installation 300 includes a water passageway 306 defined in part by a stationary discharge ring 308. Discharge ring 308, which surrounds runner 302 and directs a flow of water past runner blades 304, includes at least one pocket 310. Pocket 310 is positioned and dimensioned to receive a distal (or outer) end 312 of a blade 304' (see FIG. 14). A cover (or door) 314 is movable between a closed position (as shown in FIG. 13), which allows the water to flow smoothly past discharge ring 308, and an open position (as shown in FIG. 14), which allows room for blade 304' to be moved radially outwardly away from a hub 316. Blade 304' includes an integral trunnion 318 (illustrated with four stepped diameters) which moves outwardly as blade 304' is moved into pocket 310.

Turning now to FIG. 15, the internal components of hub 316 for supporting and guiding blade 304' in rotation are shown. Specifically, trunnion 318 is guided by an inner trunnion bushing 320 and an outer trunnion bushing 322, both of which are preferably monolithic or unitary in construction. Bushings 320 and 322 are preferably prevented from rotation by a press fit, but may also be keyed. During operation, trunnion 318 is prevented from radial outward (or centrifugal) movement as well as torsional rotation by a blade lever 324 removably secured about an intermediate diameter of trunnion 318. More specifically, blade lever 324 includes an annular thrust face 348 thrusting against outer trunnion bushing 322 to resist outward movement, and blade lever 324 includes an integral arm (not shown) coupled to linkage components 344 to resist torsional rotation.

Blade lever 324 is removably secured in a fixed relation about trunnion 318 by a runner blade-to-blade lever dowel arrangement 326. Dowel arrangement 326 is of a standard design which is common in the industry, and therefor is illustrated only schematically and described generally rather than in detail. In general, however, dowel arrangement 326 is a well known assembly of components which extends radially through a passage 330 in trunnion 318, and is secured to blade lever 324, to provide the dual functions of securing blade lever 324 against rotational and axial movement on trunnion 318.

Using the method described below, trunnion bushings 320 and 322 may be removed and new bushings installed without removing runner 302 from its operating position. Again, only the steps which differ from the above described method will be set forth. After removing a deflector 342 and linkage components 344, blade lever 324 is uncoupled from trunnion 318 by disassembling and removing dowel arrangement 326 (using appropriate lifting devices). Once dowel arrangement 326 is removed, trunnion 318 is free to slide radially outwardly, with distal end 312 of blade 304' moving into pocket 310. When an inner end 346 of trunnion 318 clears thrust face 348 of blade lever 324, blade lever 324 can be dropped down out of hub 316. Inner trunnion bushing 320 is then removed in a radial outward direction, and outer trunnion bushing 322 is removed in a radial inward direction. New bushings and seals can now be installed and the hub reassembled in the reverse manner of that described.

Figure 16:
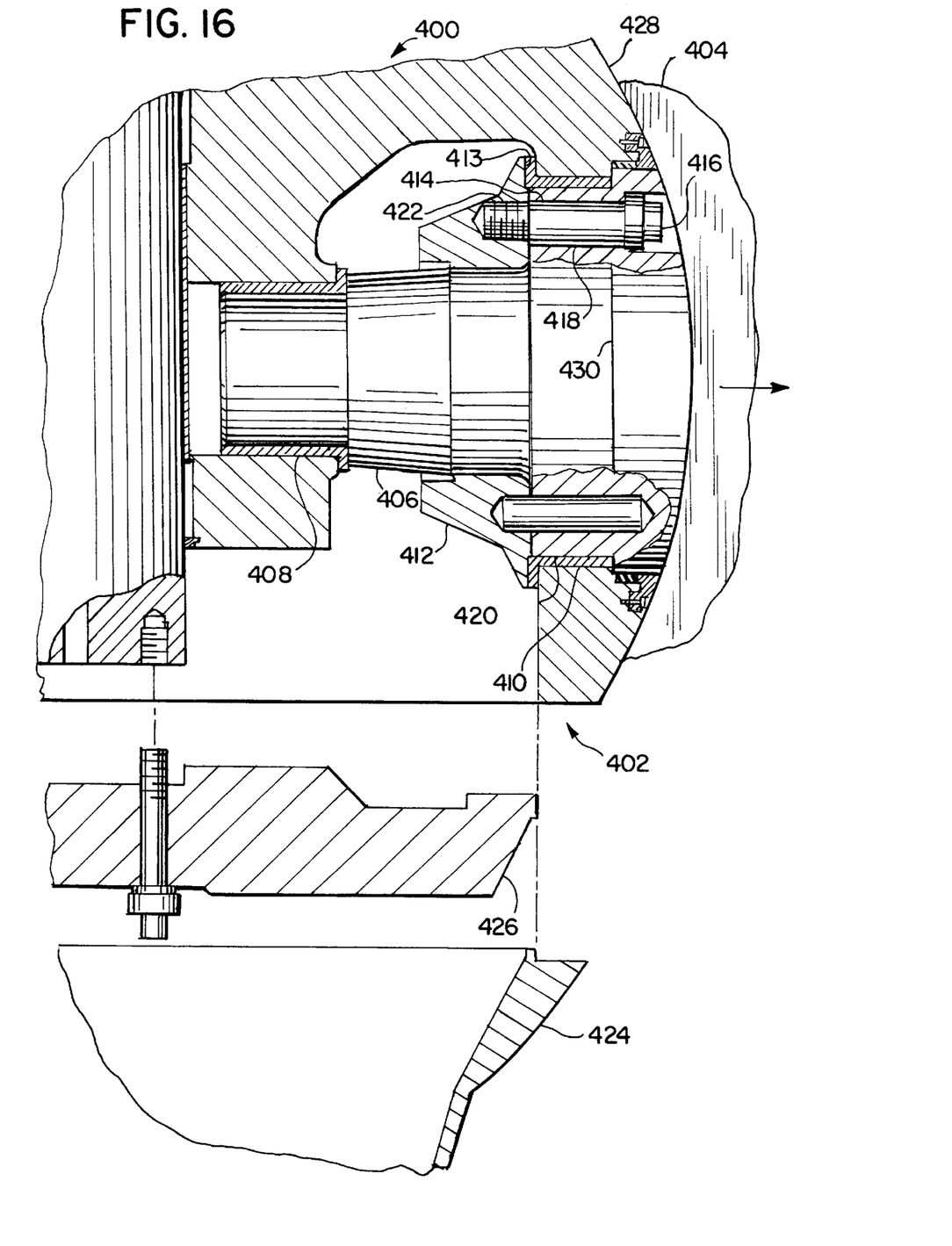
FIG. 16 is an enlarged partial sectional view of another blade support assembly rotatably supporting a blade with a detachable trunnion, illustrating the deflector and lower hub section being removed.

Turning now to FIG. 16, another embodiment of a turbine installation 400 of the type having a runner 402 with variable pitch blades 404 and a corresponding method of assembly (or disassembly) will be described. Again, the description of turbine 400 and the method of assembly (or disassembly) will be generally limited to aspects thereof which differ from turbines 10 and 300 and the methods described above, with the remaining aspects otherwise being substantially the same.

Runner 402 includes at least one blade 404 removably coupled to an associated blade trunnion 406. Trunnion 406 is guided in rotation by an inner trunnion bushing 408 and an outer trunnion bushing 410, and prevented from both radially outward movement and torsional rotation by a blade lever 412. More specifically, blade lever 412 includes an annular thrust face 413 which thrusts against outer trunnion bushing 410 to resist outward movement, and blade lever 412 is coupled to blade rotation linkage components to resist torsional rotation. Blade lever 412 is secured in place by a plurality of bolts 414 which have headed ends 416 secured in blade 404, shafts 418 extending through a radial flange 420 of trunnion 406, and threaded ends 422 threaded into blade lever 412.

Trunnion bushings 408 and 410 may be removed and new bushings installed without removing runner 402 from its operating position. After removing a deflector 424 and a lower portion 426 of a hub 428, bolts 414 are removed to uncouple blade 404 and blade lever 412 from trunnion 406. At this point, blade 404 can be moved radially outwardly into a discharge ring pocket until an inner edge 430 of blade 404 is clear of hub 428. At that point, rather than continuing to move blade 404 further radially outwardly, hub 428 may be rotated by a few degrees until sufficient working room is available to slide trunnion 406 radially outwardly from hub 428 (because blade 404 is no longer in the way). The remainder of the steps are similar to the method described above with reference to FIG. 15. However, an advantage of this method is that a relatively shallow pocket, perhaps only a few inches deep, will suffice.

Although a variety of embodiments have been described herein, it should be understood that the above description is of preferred exemplary embodiments of the present invention, and that the invention is not limited to the specific forms described. For example, the linkage mechanism and blade support assemblies need not be of the kind described above. In addition, the shapes and operations of the working components and their order with respect to the method of assembling or disassembling the hub are particularly suitable to rearrangement. Such other constructions are, nevertheless, considered within the scope of this invention. Accordingly, these and other substitutions, modifications, changes and omissions may be made in the design and arrangement of the elements and in their method of assembly and disassembly as disclosed herein without departing from the scope of the appended claims.

What is claimed is:

1. A method of replacing a turbine component in a turbine runner situated in a water passageway leading from an upper elevation source to a lower elevation discharge region, the turbine runner of the type comprising a hollow hub filled with an environmentally compatible fluid and a plurality of blades pivotally connected to the hub, the hub having spaced apart outer and inner surfaces defining a cavity, each blade having a trunnion and being supported in rotation by an associated blade support assembly including at least one trunnion bushing, the cavity substantially enclosing the support assemblies, the method comprising the steps of:

assembling a maintenance platform in the water passageway below the runner;

removing at least one old trunnion bushing from the associated blade support assembly for at least one of the blades;

installing, for the at least one of the blades, at least one new trunnion bushing in the associated blade support assembly;

filling the cavity with fresh environmentally compatible fluid; and removing the maintenance platform from the water passageway.

2. The method of claim 1, wherein the at least one trunnion bushing of the associated blade support assembly includes inner and outer trunnion bushings, the installing step comprising:

installing a new inner trunnion bushing and a new outer trunnion bushing for the associated blade support assembly, the new trunnion bushings being of a self-lubricating type.

3. The method of claim 2, wherein the hub includes an inner hub extending downwardly into the cavity for supporting the inner trunnion bushing, the inner hub being split into an upper inner hub and a lower inner hub configured to matingly engage one another with the inner trunnion bushing therebetween, the installing step further comprising:

mating the lower inner hub to the upper inner hub with the new inner trunnion bushing received therebetween, the new inner trunnion bushing guiding an associated trunnion of the at least one of the blades.

4. The method of claim 3, wherein the new inner trunnion bushing is configured as a split bushing including a first bushing half and a second bushing half for guiding the associated trunnion, the installing step further comprising:

keying the first bushing half to the upper inner hub; and keying the second bushing half to the lower inner hub with the associated trunnion guided between the first and second bushing halves.

5. The method of claim 3, wherein the new inner trunnion bushing is configured as a unitary bushing with at least one key formed thereon engageable with a slot formed in one of the upper and lower inner hubs, the installing step further comprising:

inserting the associated trunnion into the new inner trunnion bushing;

positioning the new inner trunnion bushing against the upper inner hub with the at least one key engaged with the slot.

6. The method of claim 2, wherein the new outer trunnion bushing is configured as a unitary bushing with a surrounding flange, the installing step further comprising:

lifting the new outer trunnion bushing into the cavity; and shifting the new outer trunnion bushing radially outwardly until the flange engages the inner surface of the hub.

7. The method of claim 1, wherein the turbine runner is surrounded by a discharge ring for directing a flow of water past the runner blades, the discharge ring including at least one pocket configured to receive a distal end of the at least one of the blades, the installing step comprising:

sliding the at least one of the blades radially outwardly until the distal end thereof is within the pocket;

positioning the at least one new trunnion bushing within the cavity in axial alignment with an associated trunnion of the at least one of the blades; and sliding the at least one of the blades radially inwardly until the distal end is free of the pocket and the associated trunnion extends within the at least one new trunnion bushing for guided rotation therein.

8. The method of claim 7, wherein the at least one of the blades is detachable from the associated trunnion, the installing step further comprising:

between the sliding outwardly and positioning steps, rotating the runner from a first position to a second position and then shifting the associated trunnion radially outwardly;

between the positioning and sliding inwardly steps, shifting the associated trunnion radially inwardly and then rotating the runner from the second position back to the first position; and after the sliding inwardly step, bolting the at least one of the blades to the associated trunnion.

9. The method of claim 7, wherein the at least one of the blades is integral with the associated trunnion, and wherein a blade lever is configured to be removably secured in place around the associated trunnion by a radially extending dowel assembly, the installing step further comprising:

after the sliding inwardly step, inserting the dowel assembly radially through the associated trunnion and the blade lever; and securing the dowel assembly to the blade lever.

10. The method of claim 1, wherein a single acting trunnion seal surrounds an associated collar of the at least one of the blades, the method further comprising:

placing a split seal packing around the associated collar with components thereof oriented in a direction to prevent fluid from entering the hub; and bonding the split seal packing to form a corresponding annular seal packing around the associated collar.

11. A method of replacing a turbine component in a turbine runner situated in a water passageway leading from an upper elevation source to a lower elevation discharge region, the turbine runner of the type comprising a hollow hub and a plurality of blades pivotally connected to the hub, the hub having spaced apart outer and inner surfaces defining a cavity, each blade detachable from an associated trunnion and being supported in rotation by an associated blade support assembly including at least one trunnion bushing, the cavity substantially enclosing the support assemblies and the trunnions, the at least one trunnion bushing guiding the associated trunnion in rotation, and the at least one trunnion bushing and the associated trunnion configured to be removable and installable in the cavity without disturbing the at least one of the blades, the method comprising the steps of:

assembling a maintenance platform in the water passageway below the runner;

removing at least one old trunnion bushing from the associated blade support assembly for at least one of the blades;

installing, for the at least one of the blades, at least one new trunnion bushing in the associated blade support assembly;

positioning the associated trunnion of the at least one of the blades for guided rotation by the at least one new trunnion bushing;

attaching the at least one of the blades to the associated trunnion; and removing the maintenance platform from the water passageway.

12. The method of claim 11, wherein the turbine runner is of the type in which the hub cavity is filled with an environmentally compatible fluid, the method further comprising:

filling the cavity with fresh environmentally compatible fluid.

13. The method of claim 11, wherein the at least one trunnion bushing of the associated blade support assembly includes inner and outer trunnion bushings, the installing step comprising:

installing a new inner trunnion bushing and a new outer trunnion bushing for the associated blade support assembly, the new trunnion bushings being of a self-lubricating type.

14. The method of claim 13, wherein the hub includes an inner hub extending downwardly into the cavity for supporting the inner trunnion bushing, the inner hub being split into an upper inner hub and a lower inner hub configured to matingly engage one another with the inner trunnion bushing therebetween, the installing step further comprising:

mating the lower inner hub to the upper inner hub with the new inner trunnion bushing received therebetween, the new inner trunnion bushing guiding the associated trunnion of the at least one of the blades.

15. The method of claim 14, wherein the new inner trunnion bushing is configured as a split bushing including a first bushing half and a second bushing half for guiding the associated trunnion, the installing step further comprising:

keying the first bushing half to the upper inner hub; and keying the second bushing half to the lower inner hub with the associated trunnion guided between the first and second bushing halves.

16. The method of claim 11, further comprising supporting the at least one of the blades with a sling during the installing, positioning and coupling steps.

17. A method of replacing a turbine component in a turbine runner situated in a water passageway leading from an upper elevation source to a lower elevation discharge region, the turbine runner of the type comprising a hollow hub filled with an environmentally compatible fluid and a plurality of blades pivotally connected to the hub, the hub having spaced apart outer and inner surfaces defining a cavity, each blade having a trunnion and being supported in rotation by an associated blade support assembly including at least one trunnion bushing, the cavity substantially enclosing the support assemblies, the turbine runner being surrounded by a discharge ring for directing a flow of water past the runner blades, the discharge ring including at least one pocket configured to receive a distal end of at least one of the blades, the method comprising the steps of:

assembling a maintenance platform in the water passageway below the runner;

sliding at least one of the blades radially outwardly until a distal end thereof is within the pocket;

removing at least one old trunnion bushing from the associated blade support assembly for the at least one of the blades;

positioning at least one new trunnion bushing within the cavity in axial alignment with an associated trunnion of the at least one of the blades;

sliding the at least one of the blades radially inwardly until the distal end is free of the pocket and the associated trunnion extends within the at least one new trunnion bushing for guided rotation therein; and removing the maintenance platform from the water passageway.

18. The method of claim 17, wherein the at least one trunnion bushing of the associated blade support assembly includes inner and outer trunnion bushings, the positioning step further comprising:

positioning a new inner trunnion bushing and a new outer trunnion bushing for the associated blade support assembly in axial alignment with the associated trunnion of the at least one of the blades, the new trunnion bushings being of a self-lubricating type.

19. The method of claim 17, wherein the at least one of the blades is detachable from the associated trunnion, the method further comprising:

between the sliding outwardly and positioning steps, rotating the runner from a first position to a second position and then shifting the associated trunnion radially outwardly;

between the positioning and sliding inwardly steps, shifting the associated trunnion radially inwardly and then rotating the runner from the second position back to the first position; and after the sliding inwardly step, bolting the at least one of the blades to the associated trunnion.

20. The method of claim 17, wherein the at least one of the blades is integral with the associated trunnion, and wherein a blade lever is configured to be removably secured in place around the associated trunnion by a radially extending dowel assembly, the method further comprising:

after the sliding inwardly step, inserting the dowel assembly radially through the associated trunnion and the blade lever; and securing the dowel assembly to the blade lever.

* * * * *